United States Patent
Retondo

[11] Patent Number: 5,888,030
[45] Date of Patent: Mar. 30, 1999

[54] CIRCULAR INSERT TOOL HOLDER ASSEMBLY

[76] Inventor: Mark Edward Retondo, 7025 Monroe Ave., Niles, Ill. 60714

[21] Appl. No.: 681,052

[22] Filed: Jul. 22, 1996

[51] Int. Cl.$^6$ .................................................. B23B 29/12
[52] U.S. Cl. ........................ 407/77; 407/81; 407/87; 407/94
[58] Field of Search .................... 407/77, 81, 83, 407/85, 87, 88, 89, 94, 108, 107, 90; 82/1.11, 158, 161

[56] References Cited

U.S. PATENT DOCUMENTS

| | | |
|---|---|---|
| 280,148 | 6/1883 | Douglas . |
| 811,786 | 2/1906 | Miller .......................................... 82/161 |
| 830,779 | 9/1906 | Geer ........................................ 407/94 X |
| 1,361,198 | 12/1920 | Strand . |
| 2,584,505 | 2/1952 | Severson ................................ 407/87 X |
| 2,842,233 | 7/1958 | Greenleaf ............................ 407/108 X |
| 2,875,662 | 3/1959 | Poorman . |
| 3,298,254 | 1/1967 | Vassallo . |
| 3,455,189 | 7/1969 | Sweet . |
| 3,660,878 | 5/1972 | White . |
| 4,163,624 | 8/1979 | Eckle . |
| 4,277,993 | 7/1981 | Engels ......................................... 82/161 |
| 4,292,865 | 10/1981 | Liu et al. ..................................... 82/158 |
| 4,393,735 | 7/1983 | Eckle et al. . |
| 4,414,870 | 11/1983 | Peterson, Jr. et al. . |
| 4,575,287 | 3/1986 | Oshnock et al. . |
| 4,819,703 | 4/1989 | Rice et al. . |
| 5,007,774 | 4/1991 | Kromer . |
| 5,183,089 | 2/1993 | Norlander et al. . |
| 5,272,945 | 12/1993 | Lockard . |
| 5,288,180 | 2/1994 | Hedlund . |
| 5,345,846 | 9/1994 | Somma . |

FOREIGN PATENT DOCUMENTS 570225  10/1973  Switzerland .

*Primary Examiner*—Andrea L. Pitts
*Assistant Examiner*—Henry W.H. Tsai
*Attorney, Agent, or Firm*—McDermott, Will & Emery

[57] ABSTRACT

The circular insert tool holder assembly for use with a circular tool post and for holding a resharpenable insert tool which has a top surface, a bottom surface, a front surface and a rear surface and having a cutting edge defined by the line formed by the intersection of the front surface and top surface of the insert tool, comprises a tool holder body, structure for rotatably mounting the tool holder body to the circular tool post, the tool holder body having a cavity therein, the cavity having an upper portion and a lower portion, the lower cavity portion being defined by an upper wall and a rear wall, and, a mechanism for retaining the insert tool within the upper cavity portion whereby the top surface of the insert tool is positioned along the upper wall of the cavity.

9 Claims, 4 Drawing Sheets

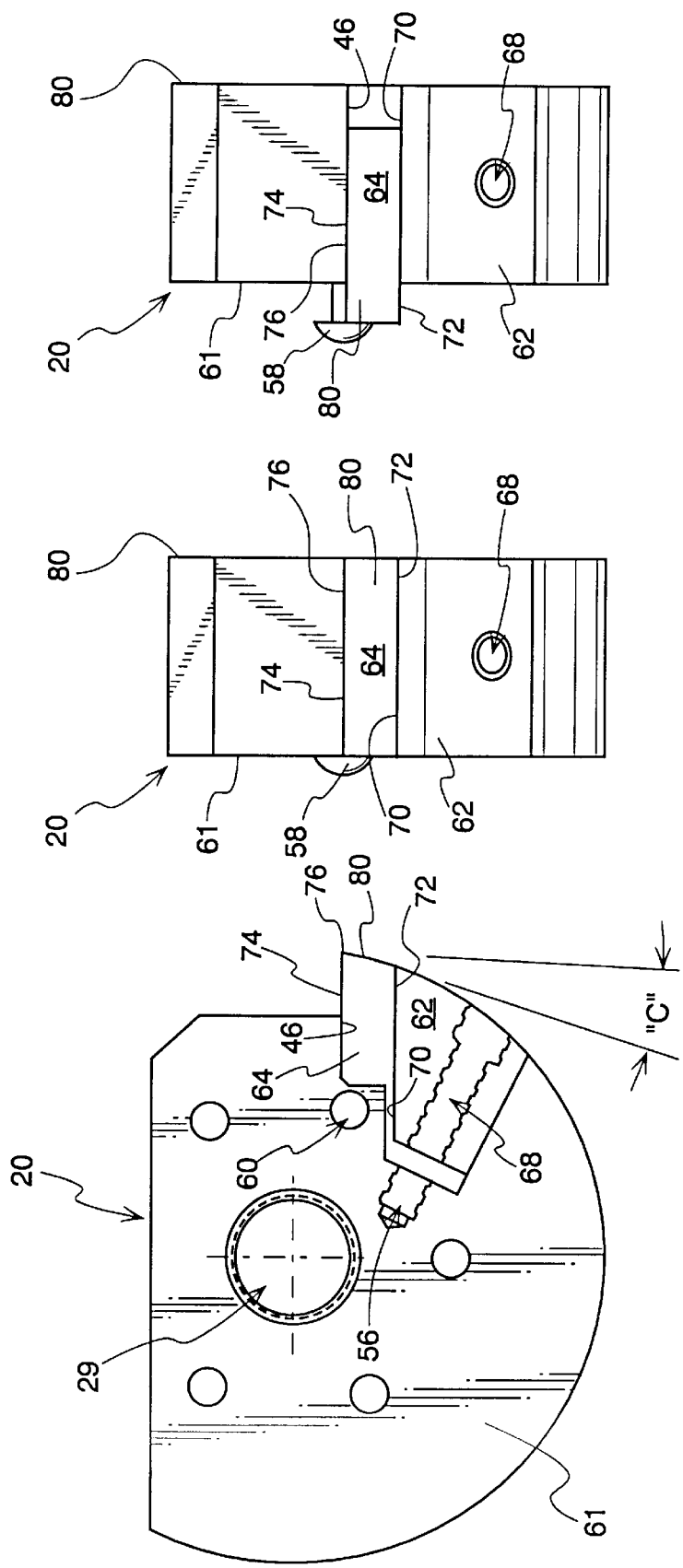

CIRCULAR INSERT TOOL HOLDER ASSEMBLY

BACKGROUND OF THE INVENTION

1. Field of the Invention

This invention relates generally to a circular insert tool holder assembly which holds a resharpenable insert tool and can be mounted in a standard circular tool post. More particularly, the assembly relates to a circular insert tool holder and an adjustable wedge member for holding the insert tool in the tool holder and for bringing a cutting edge of a new or resharpened insert tool up to "center" without rotational adjustment of the tool holder assembly.

2. Background Art

Various machine tools such as Brown & Sharpe screw machines, Index automatic bar machines and multiple spindle machines are equipped to receive a standard circular tool post. A circular form tool or a circular insert tool holder can be mounted in the tool post.

Standard circular form tools are rotatably mounted within the circular tool post. The circular form tool has a cutting edge on the circular form tool itself. As the cutting edge is sharpened, the circular form tool must be rotated within the circular tool post to keep the cutting edge up to "center". Continuous adjustment of the circular form tool causes significant down time of the machine.

Circular insert tool holders are designed to receive resharpenable insert tools which have a cutting edge for cutting a work piece. The known holders cannot keep a resharpened insert up to "center" after the insert tool has been resharpened because the insert tool is clamped down onto the holder such that after the insert tool has been sharpened and replaced, the new cutting edge is positioned below its original position.

Rotation of the circular insert tool holder to adjust the cutting edge of a resharpened insert tool back up to its original position will change the angle at which the insert tool meets the workpiece and is unacceptable. Accordingly, the resharpened insert tools cannot be adjusted to keep the cutting edge up to "center" without changing the orientation of the insert tool such that the required "rake angle" or "clearance angle" are changed.

It is desirable to provide a circular insert tool holder assembly in which an insert tool can be removed and replaced by either a new or resharpened insert tool and can be repositioned up to "center" without rotational adjustment to the circular insert tool holder and still position the insert tool having the required "rake angle" and "clearance angle".

SUMMARY OF THE INVENTION

It is one of the principal objectives of the present invention to provide an improved circular insert tool holder assembly which is adapted for use with existing, standard circular tool posts that allows a new or resharpened insert tool to be replaced in the holder and brought up to "center" without rotational adjustment of the circular insert tool holder.

It is another object of the present invention to provide an insert tool holder assembly that does not require readjusting of the tool holder after replacement of a new or resharpened insert tool to maintain the proper "rake angle" and "clearance angle".

It is further an object of the invention to provide an insert tool holder assembly in which standard resharpenable insert tools can be used.

It is still another object of the invention to provide an insert tool assembly which can be used on various machine tools that each require a different "offset" distance.

It is still further an object of the invention to provide and insert tool assembly that can be used with various machine tool operations requiring various "rake angles" and "clearance angles".

It is still further an object of the invention to provide an insert tool assembly which allows for longitudinal adjustment of an insert tool within the tool holder body.

It is still another object of the invention to provide a circular insert tool holder assembly that can hold insert tools of varying widths.

More particularly, in one form of the invention, there is provided a circular insert tool holder assembly for use with a circular tool post and for holding a resharpenable insert tool. The insert tool has a top surface, a bottom surface, a front surface and a rear surface and has a cutting edge defined by the line formed by the intersection of the front surface and top surface of the insert tool. The circular tool holder assembly comprises a tool holder body and structure for rotatably mounting the tool holder body to the circular tool post. The tool holder body has a cavity therein. The cavity has an upper portion and a lower portion. The upper cavity portion is defined by an upper wall and a rear wall. The circular tool holder assembly also comprises a mechanism for retaining the insert tool within the upper cavity portion whereby the top surface of the insert tool is positioned along the upper wall of the cavity.

BRIEF DESCRIPTION OF DRAWINGS

FIG. 5 is a side view of the circular insert tool holder shown in FIG. 1 having a wedge member and an insert tool mounted therein.

FIG. 6 is a front view of the circular insert tool holder, wedge member and insert tool shown in FIG. 5.

FIG. 7 is a front view of the circular insert tool holder, wedge member and insert tool of FIG. 5 and having the insert tool mounted in a longitudinal offset position.

DETAILED DESCRIPTION OF THE DRAWINGS

Figure 2:
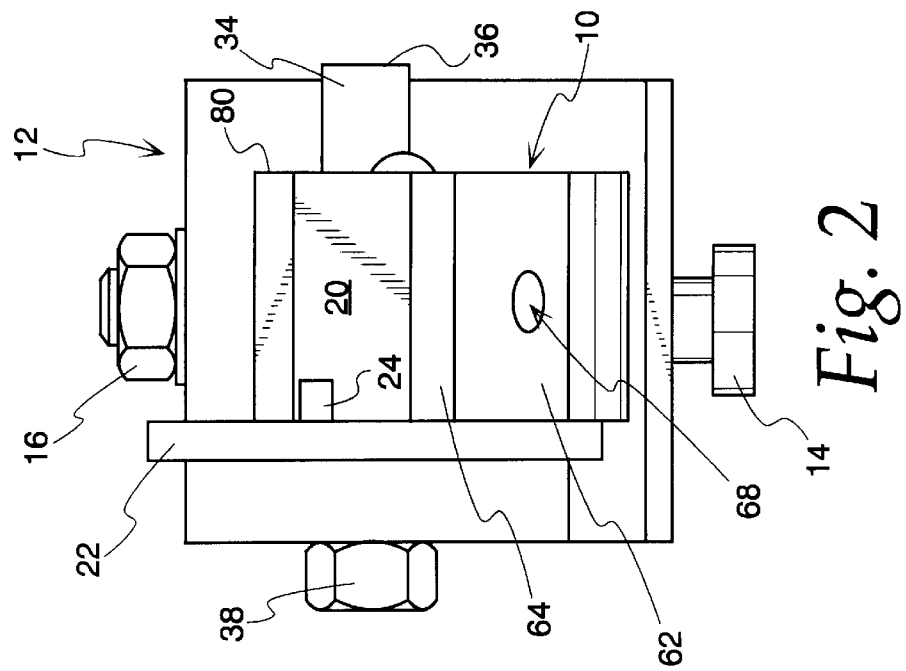
FIG. 2 is a front view of the circular insert tool holder and circular tool post of FIG. 1.
Figure 1:
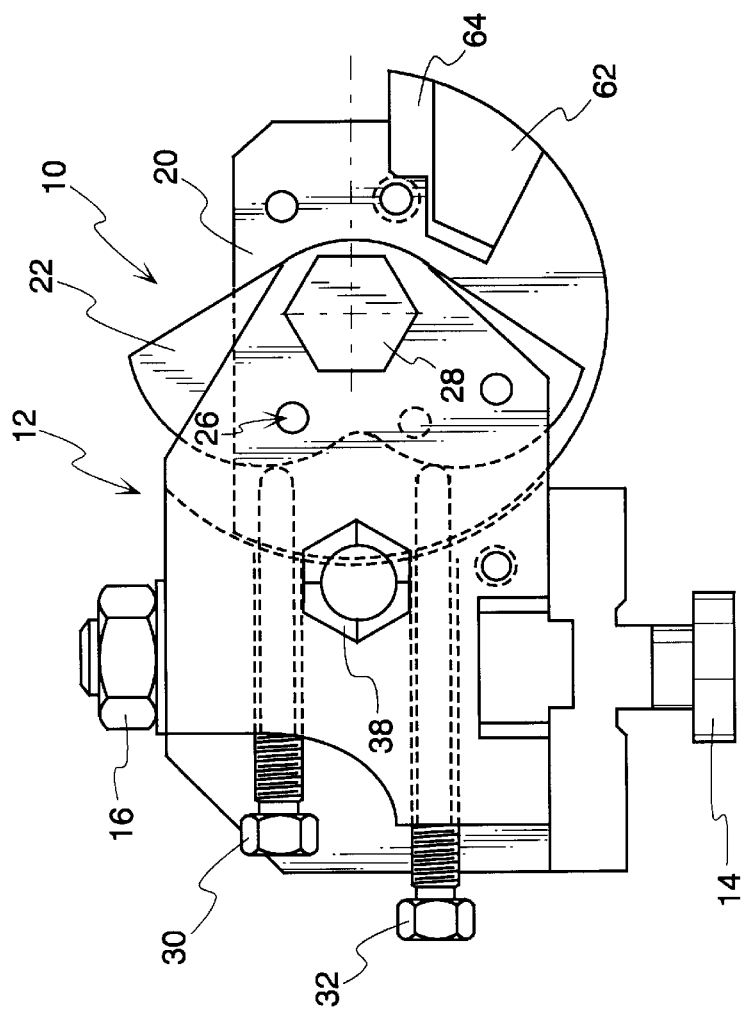
FIG. 1 is a side view of one embodiment of a circular insert tool holder mounted on a standard circular tool post.

Referring now to FIGS. 1 and 2, a circular insert tool holder assembly 10 is shown mounted in a standard circular tool post assembly 12. A clamp bolt 14 of the standard circular tool post assembly 12 is slidably mounted into a T-slot on a machine tool (not shown) and is secured by nut 16.

The circular insert tool holder assembly 10 includes a tool holder body 20. The tool holder body 20 is partly circular and is fixedly attached to a sector plate 22. The sector plate 22 has a sector plate pin 24 which is received within a bore 26 in the tool holder body 20. The tool holder body 20 and sector plate 22 are rotatably mounted to the tool post assembly 12 by a tool clamp bolt 28. The tool clamp bolt 28 passes through a bore (not shown) in the circular tool post assembly 12, a central longitudinal bore 29 (See FIGS. 3 and 5) in the tool holder body 20 and a bore (not shown) in the sector plate 22.

Adjusting screws 30 and 32 are provided within the tool post assembly 12 and are used to adjust the rotational position of the sector plate 22 and tool body 20. The tool holder body 20 can be rotatably adjusted by moving the adjusting screws 30 and 32 thereby causing the sector plate 22 and the tool holder body 20 to rotate about the tool clamp bolt 28.

Tightening of adjusting screw 30 and loosening of adjusting screw 32 will cause the sector plate 22 and tool holder body 20 to rotate in a clockwise direction as shown in FIG. 1.

Similarly, loosening of adjusting screw 30 and tightening of adjusting screw 32 will cause the sector plate 22 and tool holder body 20 to rotate in a counter-clockwise direction as shown in FIG. 1.

As will be described below with reference to FIGS. 5, 6 and 7, by adjusting the tool holder body 20 in this manner, the tool holder body 20, and an insert tool 64 positioned within the insert tool body 20, can be set in a required cutting position relative to an imaginary horizontal line (See FIGS. 3 and 5) passing through the central bore 29 in the tool post body 20.

A hook bolt 34 is also provided to ensure that the position of the tool holder body 20 can be maintained once the required cutting position of the tool holder body 20 is set. The hook bolt 34 has a hook at one end 36. The hook bolt 34 passes through the post assembly 12 and the hooked end 36 hooks around the tool holder body 20. When a nut 38 is tightened on the hook bolt 34, the tool holder body 20 is held tightly to the tool post assembly 12.

Figure 4:
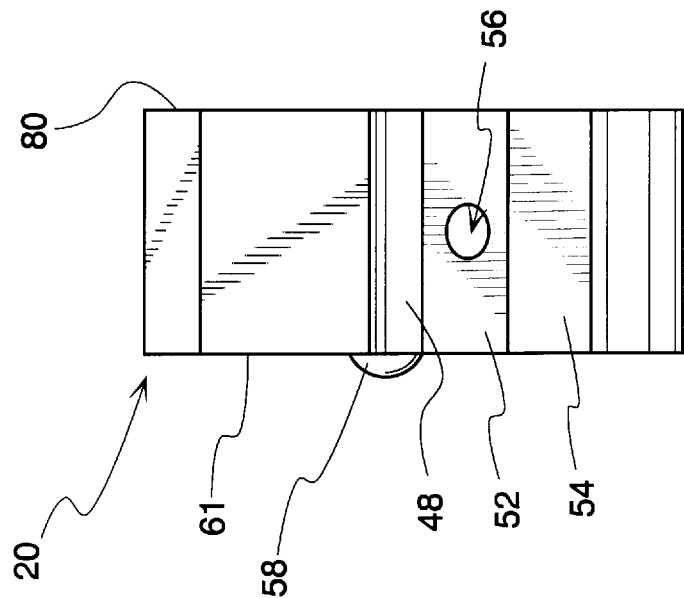
FIG. 4 is a front view of the circular insert tool holder shown in FIG. 3.
Figure 3:
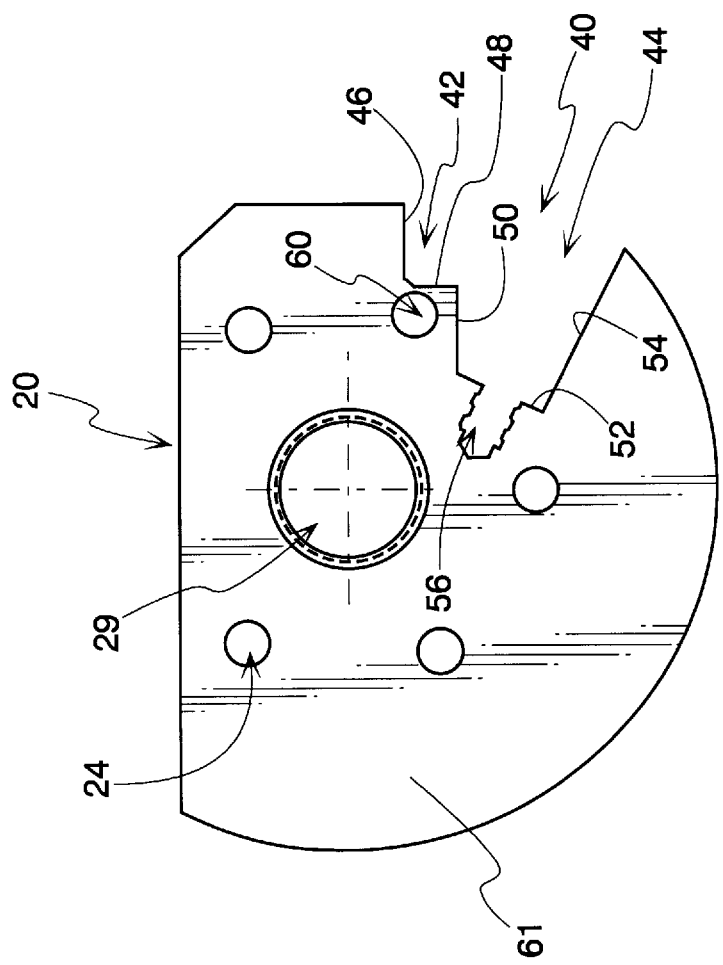
FIG. 3 is side view of the circular insert tool holder shown in FIG. 1.

Referring now to FIGS. 3 and 4, the tool holder body 20 has a cavity 40 formed therein. The cavity 40 has an upper cavity portion 42 and a lower cavity portion 44. The upper cavity portion 42 is defined by an upper wall 46 and a rear wall 48 adjacent the upper wall 46. The lower cavity portion 44 is defined by an upper wall 50, a rear wall 52 and a lower wall 54. The rear wall 52 has a threaded bore 56 therein.

Referring now to FIGS. 5, 6 and 7, the tool holder body 20 is shown with a wedge member 62 and insert tool 64 mounted therein. The wedge member 62 is received within the lower cavity portion 44. The wedge member 62 is coupled to the tool holder body 20 and drawn along the bottom wall 54 of the lower cavity portion 44 and towards the rear wall 52 by a screw or bolt (not shown). The screw or bolt is inserted through a threaded bore 68 in the wedge member 62 and into the bore 68 in the tool holder body 20.

By tightening the screw, the wedge member 62 is drawn into the lower cavity portion 44 whereby an upper surface 70 of the wedge member 62 engages a lower surface 72 of the insert tool 64. An upper surface 74 of the insert tool 64 is positioned along the upper wall 46 of the upper cavity portion 42 and keeps a cutting edge 76 of the insert tool 64 aligned with the upper wall 46 of the upper cavity portion 42. The insert tool 64 is then secured within the upper cavity portion 42 by the wedge member 62.

An "offset" is defined as the distance between the cutting edge 76 of the insert 64 and the horizontal line passing through the center of the bore 29 in the tool holder body 20. A particular machine tool requires the cutting edge 76 of the insert tool 64 to be spaced at a certain "offset" when in the cutting position. When the cutting edge 76 is positioned at the proper "offset" for a particular machine, it is said to be on "center" Also, the insert tool 64 must be set at a predetermined "rake angle" ("R") and "clearance angle" ("C"), both of which are defined below, when the cutting edge 76 is on "center". The required "rake angle" and "clearance angle" are determined by the type of cutting operation being performed and the material that the workpiece to be cut is made of. Accordingly, the tool holder body 20 must be positioned so that the cutting edge 76 of the insert tool 64 is set at a predetermined "offset" and the insert tool 64 is simultaneously set at the predetermined "rake angle" and "clearance angle" when in the cutting position.

For example, a No. 2 Brown and Sharpe machine requires a 0.250 inch "offset" when the cutting edge 76 is on "center" in the cutting position. The required "offset" with the cutting edge 76 on "center" is a set distance for a particular machine. Typically, machines have a required "offset" with the cutting edge 76 on "center" ranging from $\geq 0.125$ inches to $\leq 0.312$ inches.

The insert tool 64 is brought to "center" by rotating the tool holder body 20, with the insert tool 64 properly positioned within the tool holder body 20, so that the cutting edge 76 of the insert tool 64 is at the required "offset". Once properly positioned, the rotational position of the tool holder body 20 can be fixed by tightening of the hook bolt 34 and nut 38 to secure the tool holder body 20 relative to the tool post assembly 12 and prevent the tool holder body 20 from being rotated within the tool post assembly 12.

The rotation of the tool holder body 20 can be made by adjusting the sector adjusting screws 30 and 32 as described above. This rotational adjustment can also be made without the insert tool 64 in place and the measurement can be based off of the distance between the horizontal line and the upper wall 46 of the cavity 40.

The "rake angle" is the angle between the horizontal line passing through the center of the bore 29 and a line formed by the top surface 74 of the insert tool 64 when the cutting edge 76 of the insert tool 64 is up to "center". A range for a typically required "rake angle" is $0° \leq R \leq 10°$. As shown in FIGS. 1 and 5, the tool holder body 20 is designed for a "rake angle" of R=0°, i.e., the line formed by the top surface 74 of the insert tool 64 is parallel to the horizontal line passing through the center of the bore 29.

Note however, that the "rake angle" for a particular insert tool 64 can be varied by changing the position of the upper wall 46 of the tool holder body 20 such that when the cutting edge 76 of the insert tool 64 is up to "center" the "rake angle" is $0° \leq R \leq 10°$.

Figure 8:
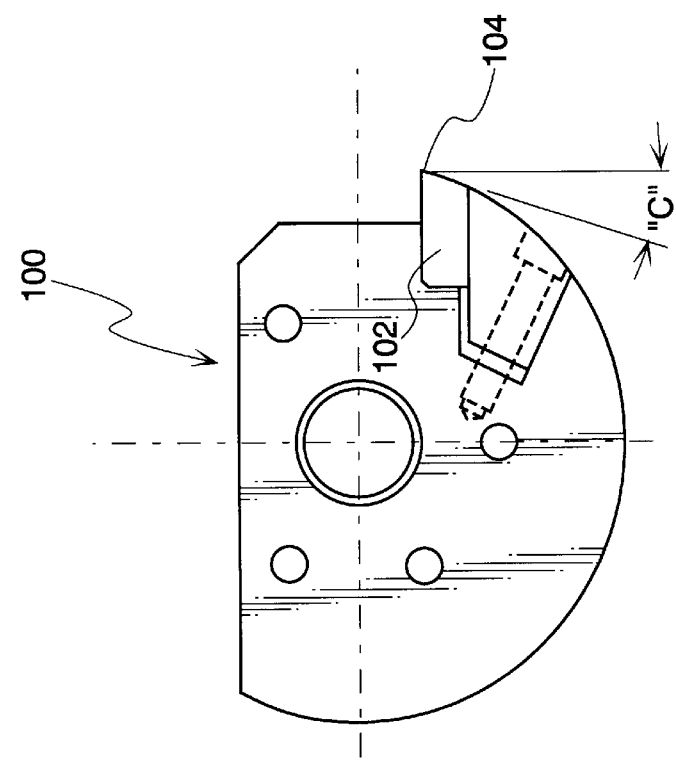
FIG. 8 is a side view of an alternate embodiment of an insert tool holder body according to the present invention.

The "clearance angle" is the angle between a vertical line (which is perpendicular to the horizontal line passing through the center of the bore 29 in the tool holder body 20) and a front face 80 of the insert tool 64 when the cutting edge 76 of the insert tool 64 is up to "center" and is shown in FIGS. 5 and 8 as "C". A range for a typically required "clearance angle" is $12° \leq C \leq 23°$. As shown in FIGS. 1 and 5, the insert tool 64 is designed for a "clearance angle" of C=12°.

The "clearance angle" for a particular insert tool 64 can be varied by using an insert tool 64 having a different angled cut on the front surface 80 to thereby provide a different "clearance angle" when the insert tool 64 is rotated up to "center".

The tool holder body 20 shown in FIGS. 5–7 is designed for a 0.250 inch "offset" and for a 0° "rake angle" and the insert tool 64 is designed for a 12° "clearance angle" when the insert tool 64 is on "center" with a 0° "rake angle". As shown in FIGS. 1 and 5, the tool holder body 20 is shown with the insert tool 64 on "center".

The upper wall 46 of the upper cavity portion 42 is set at a predetermined position within the tool holder body 20 such that when a standard insert tool 64 is on "center" in the proper cutting position, the proper "rake angle" and "clearance angle" are achieved. Once the tool holder body 20 is initially set, the insert tool 64 can be replaced by a new insert tool or can be removed, resharpened and replaced within the tool holder body 20 (as will be described below) and the tool holder body 20 will not need to be rotatably adjusted in order to bring the insert tool 64 back to "center" and have the same "rake angle" and "clearance angle".

Upon use, the cutting edge 76 of the insert tool 64 can become dull or worn. The used insert tool 64 can be removed from the assembly 10 by loosening the bolt (not shown) which holds the wedge member 62 and allowing the wedge member 62 to slide down along the bottom wall 54.

When an insert tool 64 is resharpened, the top surface 74 of the insert tool 64 is ground to restore a sharp cutting edge 76 to the insert tool 76. The grinding results in the resharpened insert tool 64 being thinner than the original insert tool 64, i.e., the distance between the upper surface 74 and the lower surface 72 of the resharpened tool 64 is less than the distance between these surfaces prior to resharpening of the insert tool 64.

The new or resharpened insert tool 64 can be reinserted into the upper cavity portion 42 of the tool holder body 20 and easily brought back up to "center" by securing the wedge member 62 within the lower cavity portion 44 and securing the insert tool 64 within the insert tool body 20 as described above. No rotation of the tool holder body 20 is needed to bring the insert tool 64 back up to "center" and to provide the same "rake angle" and "clearance angle".

Note that an adjustable side bolt 58 (FIG. 4) is also threaded into a longitudinal bore 60 (FIG. 3) in one side 61 of the tool holder body 20.

Note that the adjustable side bolt 58 allows the insert tool 64 to be mounted within the tool holder body 20 at a longitudinally displaced position relative to the tool holder body 20, as shown in FIGS. 6 and 7, or allows for insert tools that are wider that the insert tool holder 20 to be mounted in the tool holder body 20 and still be replaced in an identical position. As shown in FIG. 6, the side bolt 58 can be positioned flush with the left side 61 of the tool holder body 20 to ensure that the insert 64 is mounted flush within the tool holder body 20.

Alternatively, the side bolt 58 can be set at a distance from the left side 61 of the tool holder body 20 to allow the insert 64 to be mounted within the tool holder body 20 at a longitudinally displaced position, as shown in FIG. 7, or to receive a wider insert tool (not shown). Note also that although the side bolt 58 is shown inserted into the left side 61 of the tool holder body 20, it can be inserted into to a right side 80 of the tool holder body 20 as well and adjusted as described above.

The required "offset" is dictated by the type of machine on which the tool holder is being used. Furthermore, each machine tool requires a certain "offset". Additionally, based on the machine tool operation to be performed and the type of material the workpiece being cut, certain "rake angles" and "clearance angles" are used.

By changing the position of the upper wall 46 within the tool holder body 20, the tool holder body 20 can be designed to work with tool holder assemblies for use with a variety of machines and for a variety of machine tool operations.

Figure 9:
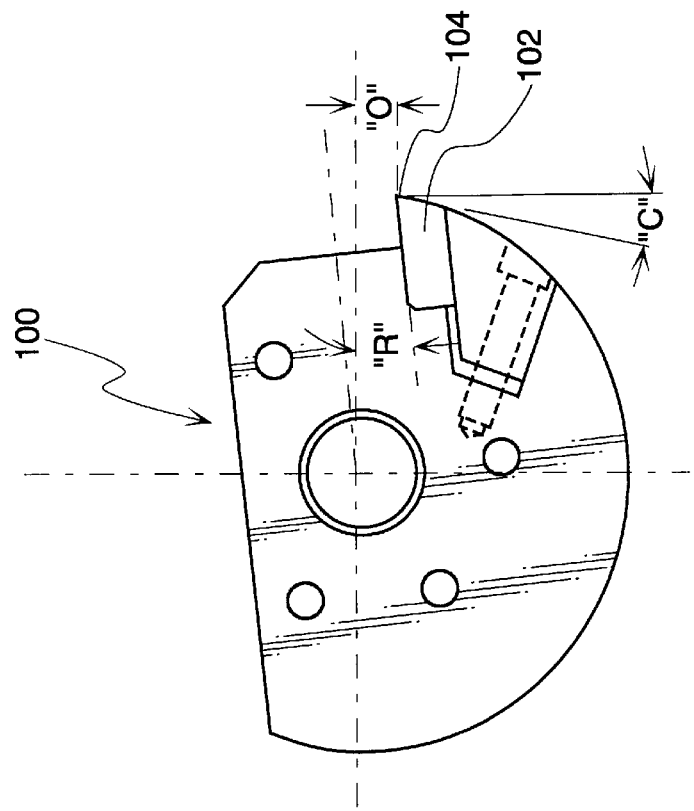
FIG. 9 is a side view of the insert tool holder body shown in FIG. 8 shown with an insert tool therein which is rotated up to "center".

For example, as shown in FIGS. 8 and 9, an alternate embodiment of a tool holder body 100 is shown. The tool holder body 100 is designed for a machine tool that requires a 0.250 inch "offset" when on "center" in the cutting position and for a machine tool operation that requires a 5° "rake angle". An insert tool 102 therein is designed to provide a 12° "clearance angle" when set at the 5° "rake angle".

As shown in FIG. 8, the tool holder body 100 has an insert tool 102 secured therein in the same manner as the insert tool 64 is secured in the tool holder 20 described in FIGS. 1–7. Note however, that in FIG. 8, a cutting edge 104 of the insert 102 is not on "center" but rather it shown with a 0.378 inch "offset". Furthermore, in the position shown in FIG. 8, the "rake angle" is 0° (the top surface of the insert 102 is parallel to the horizontal center line passing through the bore in the tool holder body 100) and the "clearance angle" is 17°.

In order to bring the insert tool 102 up to "center" with an "offset" of 0.250 inches, the insert tool holder 100 must be rotated 5° counter-clockwise to the position shown in FIG. 9.

As shown in FIG. 9, the insert tool 102 is in proper cutting position inasmuch as the cutting edge 104 of the insert tool 102 is up to "center", i.e., has an "offset" of 0.250 inches, and the insert tool 102 has at the required "rake angle" (5°) and "clearance angle" (12°).

As described above with respect to FIGS. 1–7, the tool holder body 100 can be secured within the assembly 10 in the position shown in FIG. 9 and the insert tool 102 can be sharpened and replaced or a new insert tool can be positioned within the tool holder body 100 in the proper cutting position , i.e., at the required "offset", "rake angle" and "clearance angle", without additional rotational adjustment to the tool holder body 100.

From the foregoing description, it will be apparent that the circular insert tool holder assembly 10 of the present invention has a number of advantages, some of which have been described above and others of which are inherent in the circular insert tool holder assembly 10 of the present invention. Also, it will be understood that modifications can be made to the circular insert tool holder assembly 10 of the present invention without departing from the teachings of the invention. Accordingly the scope of the invention is only to be limited as necessitated by the accompanying claims.

I claim:

1. A circular insert tool holder assembly for use with a circular tool post and for holding a resharpenable insert tool which has a top surface, a bottom surface, a front surface and a rear surface and having a cutting edge defined by a line formed by an intersection of the front surface and top surface of the insert tool, said circular insert tool holder assembly comprising:

a tool holder body;

means for rotatably mounting said tool holder body to the circular tool post;

said tool holder body having a cavity therein, said cavity having an upper cavity portion and a lower cavity portion, said upper cavity portion being defined by an upper wall and a rear wall;

means for retaining the insert tool within said upper cavity portion whereby the top surface of the insert tool is positioned along said upper wall of said cavity, wherein said means for retaining the insert tool within said cavity and along said upper wall is positionable within the lower cavity portion of said tool holder body and includes a wedge member having a bore therein and a bolt;

said lower cavity portion is defined by a lower wall, a rear wall and an upper wall;

said tool holder body having a bore therein through said rear wall of said lower cavity portion; and whereby said wedge member is slidably received on said lower wall of said lower cavity portion and secured to said tool holder body by a bolt passing through said bores in said wedge member and said tool holder body.

2. The circular insert tool holder assembly of claim 1 wherein said tool holder body includes means for allowing longitudinal adjustment of the insert tool within said tool holder body.

3. The circular insert tool holder assembly of claim 2 wherein said means for allowing longitudinal adjustment of the insert tool within said body includes a longitudinal bore in a side of said tool holder body and a bolt whereby said bolt can be adjustably threaded within said longitudinal bore.

4. The circular insert tool holder assembly of claim 1 wherein the circular tool post and said tool holder body have aligned longitudinal bores therein and said means for rotatably mounting said tool holder body to said circular tool post includes a mounting bolt which passes through said longitudinal bores of the circular tool post and said tool holder body.

5. The tool holder assembly of claim 4 further including means for rotating said tool holder body within the tool post assembly, said means for rotating said tool holder body including:

an abutment structure fixedly attached to said tool holder body; and, an adjusting screw which is threaded through a bore in the tool post body and engages the abutment structure, whereby longitudinal movement of said screw within the bore causes said tool holder body to rotate about said mounting bolt.

6. The tool holder assembly of claim 5 wherein said abutment structure includes a plate which is attached to said tool holder body.

7. A tool holder assembly for holding a resharpenable insert tool having a top surface and for use with a circular tool post comprising:

a tool holder body having a cavity therein, said cavity being partly defined by an abutment surface of said tool holder body, means for securing the insert tool within said cavity whereby the top surface of the insert tool abuts said abutment surface; and means for rotatably adjusting said tool holder body within the circular tool post, wherein said means for securing the insert tool within said cavity includes a wedge member which is slidably received in said cavity and is positioned below the insert tool and means for securing the wedge member to the tool holds body.

8. The tool holder assembly of claim 7 wherein said means for securing the wedge member to the tool holder body includes a bolt that is inserted through said wedge member and threaded into a bore in said tool holder body.

9. The tool holder assembly of claim 7 further including means for allowing the insert tool to be positioned within said cavity in a longitudinally displaced position relative to said tool holder body.

* * * * *